S. L. SEARS.
GLASS DISCHARGING DEVICE.
APPLICATION FILED AUG. 19, 1914.
1,343,183.
Patented June 8, 1920.
3 SHEETS—SHEET 1.
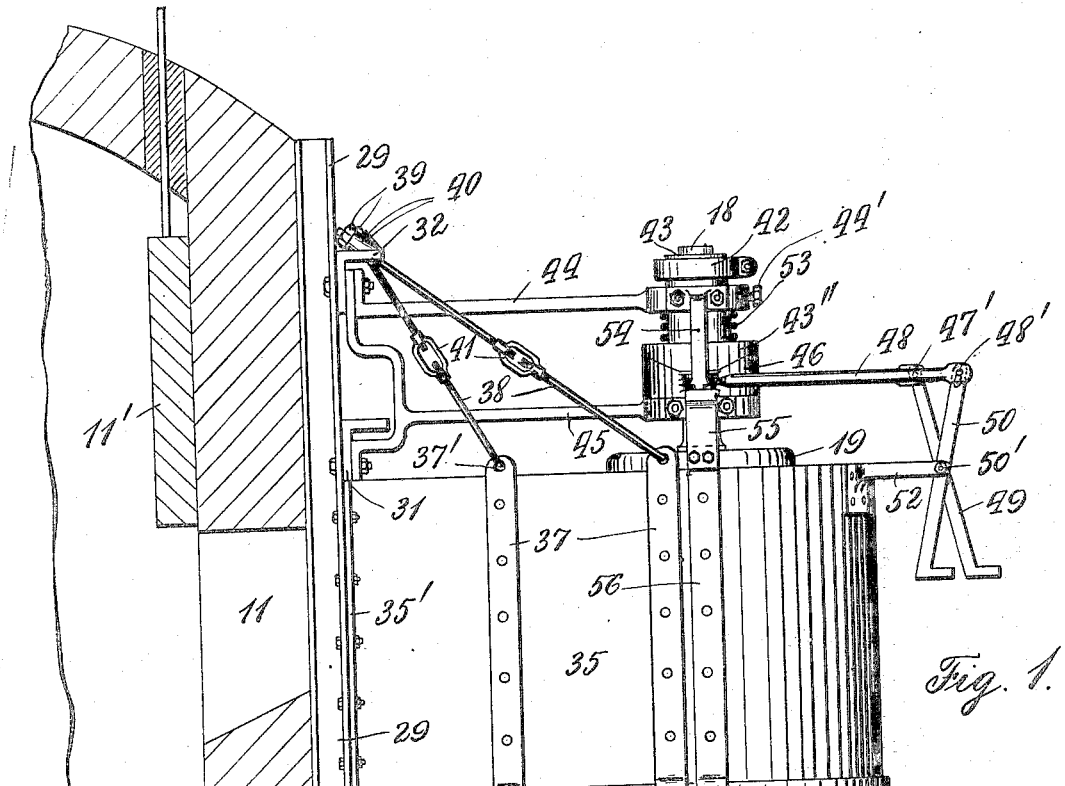
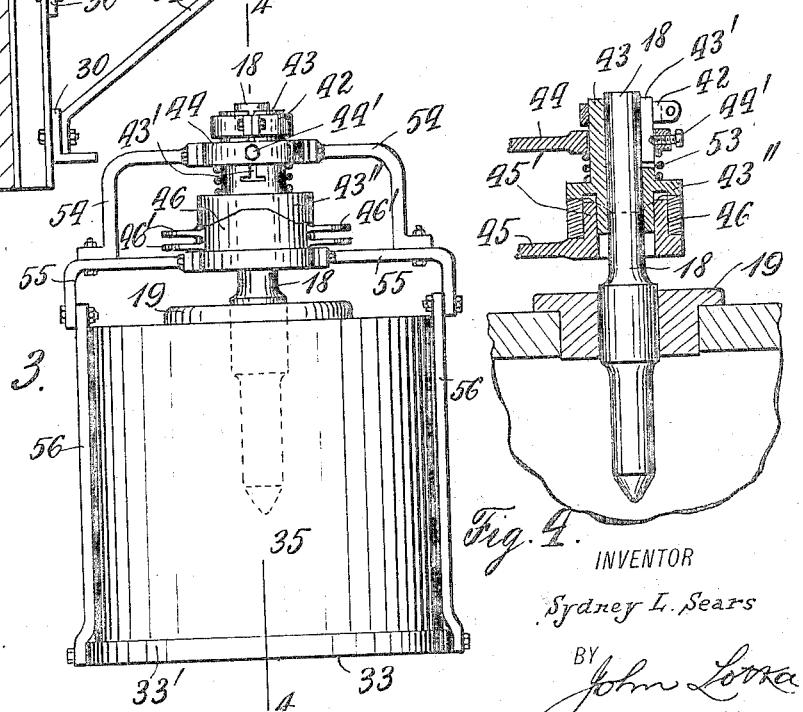
WITNESSES:
Johannes Fritze
Charles A. Mathe
INVENTOR
Sydney L. Sears
BY John Loora
ATTORNEY S. L. SEARS.
GLASS DISCHARGING DEVICE.
APPLICATION FILED AUG. 19, 1914.
1,343,183.
Patented June 8, 1920.
3 SHEETS—SHEET 2.
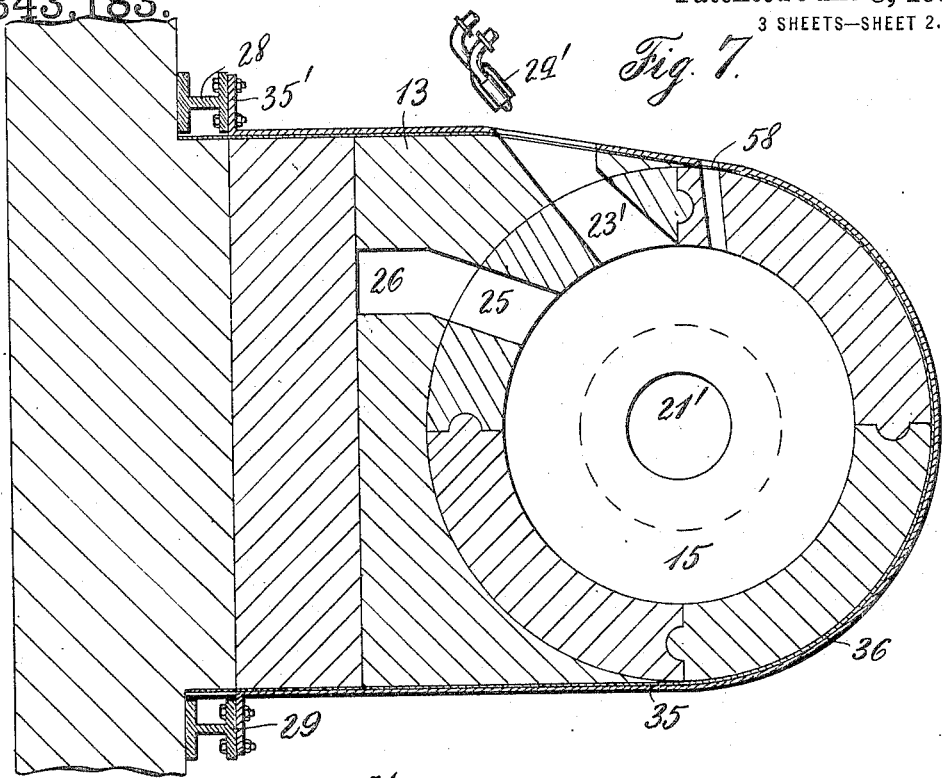
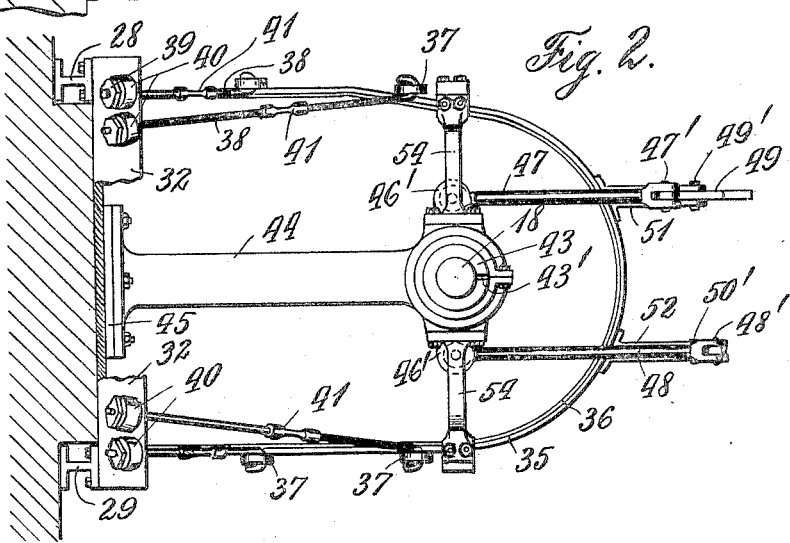
WITNESSES:
Johannes Fritze
Charles A. Mathé
INVENTOR
Sydney L. Sears
BY John Lotka
ATTORNEY

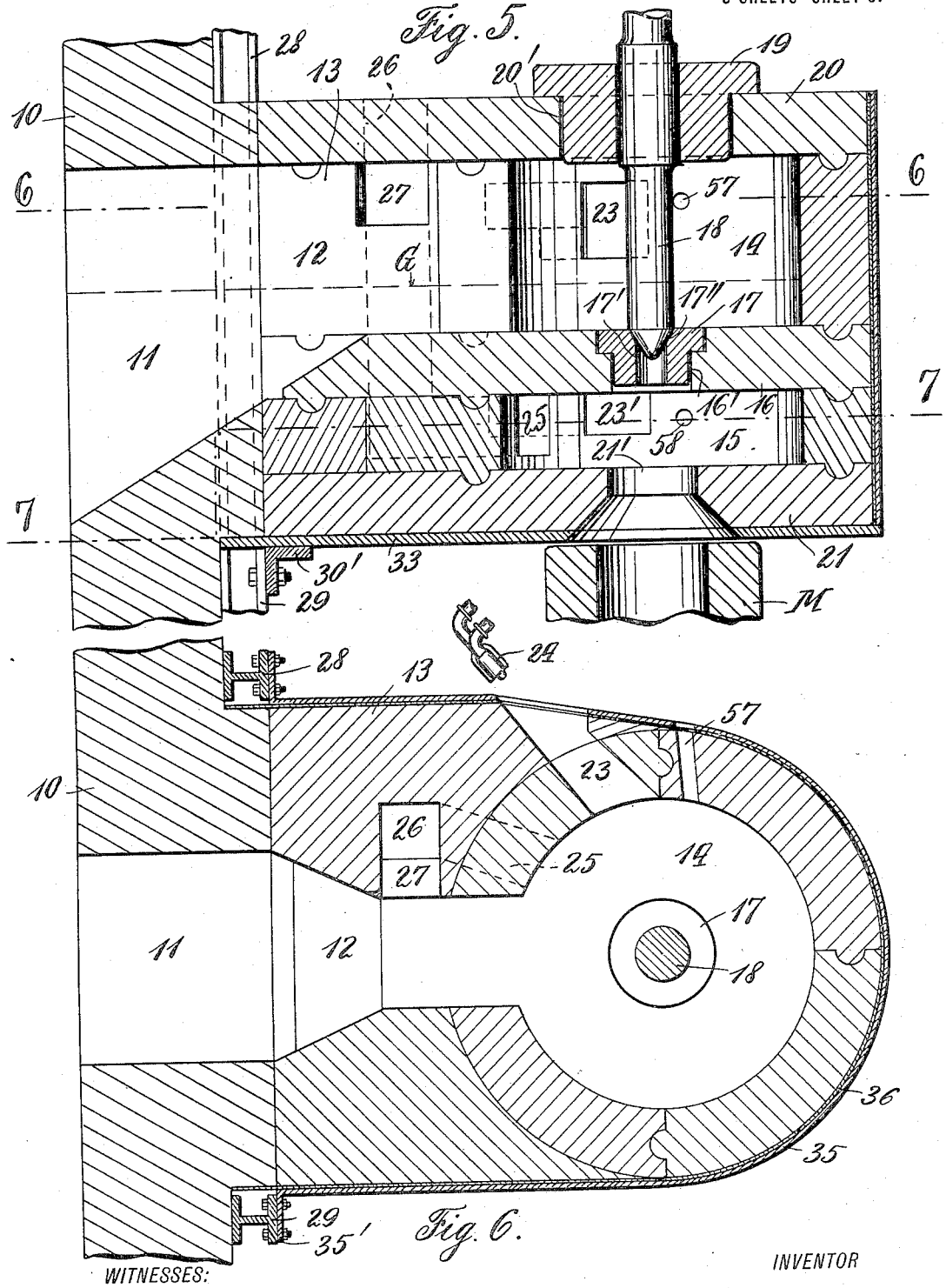

UNITED STATES PATENT OFFICE.

SYDNEY L. SEARS, OF LYNDHURST, NEW JERSEY, ASSIGNOR TO UNITED BOTTLE MACHINERY CO., OF NEW YORK, N. Y., A CORPORATION OF NEW YORK.

GLASS-DISCHARGING DEVICE.

1,343,183.  Specification of Letters Patent.  Patented June 8, 1920.

Application filed August 19, 1914. Serial No. 857,463.

*To all whom it may concern:*

Be it known that I, SYDNEY L. SEARS, a citizen of the United States, and resident of Lyndhurst, in the county of Bergen and State of New Jersey, have invented certain new and useful Improvements in Glass-Discharging Devices, of which the following is a specification.

My invention relates to apparatus for discharging liquid glass from glass-melting furnaces and is especially designed for use in the manufacture of glass articles such as bottles or the like, where it is desired to draw off a small quantity of molten glass and to transfer it to a mold or the like in which the bottle is to be blown.

In apparatus of this kind it is of great importance that the molten glass be maintained at a uniform temperature and consistency. The object of my invention is to provide a tank or auxiliary furnace, adapted to be interposed between the glass melting furnace and the glass-receiving mold in which the glass will retain its temperature and consistency, or will even be heated to a higher degree if desired. A further object of my invention is to provide means whereby a measured and uniform quantity of molten glass can be transferred quickly and with great accuracy from the auxiliary furnace to the glass-receiving mold or other receptacle, without being exposed to the outside air, so that it cannot cool. Other advantages of my invention will appear from the description following hereinafter, and the novelty will be pointed out in the appended claims.

Reference is to be had to the accompanying drawings, in which Figure 1 is a side elevation of my auxiliary tank or furnace attached to a glass-melting furnace (the latter being shown in part only, and in section), this view showing also the means for controlling the glass outlet; Fig. 2 is a top view corresponding to Fig. 1, with parts broken away; Fig. 3 is a front elevation of the auxiliary furnace and the controlling means, with parts omitted for the sake of clearness; Fig. 4 is a partial section on line 4—4 of Fig. 3; Fig. 5 is a vertical longitudinal section through the center of the auxiliary furnace, drawn on an enlarged scale; and Figs. 6 and 7 are horizontal sections taken on lines 6—6 and 7—7 respectively of Fig. 5.

The glass-melting furnace 10 (of any suitable construction) has an outlet 11 controlled by a gate valve 11' and communicating with an inlet 12 of a tank or auxiliary furnace 13 attached to the melting furnace and built of fire clay or other fire-proof material. The inlet 12 communicates with a chamber 14 preferably of circular shape, and underneath the chamber 14 is provided a similar chamber 15, these two chambers being separated from each other by a horizontal wall 16. An apertured cover 17 is adapted to close an opening 16' in the wall 16, the aperture 17' in the cover 17 having an upper portion 17'' flaring upwardly and adapted to form a seat for a rod or plunger 18. The plunger 18, whose lower end normally closes the aperture 17'', 17', extends upwardly through a cover 19 which is seated on the top wall 20 of the auxiliary furnace 13 and which closes an aperture 20' in said top wall. By removing the cover 19 and the plunger 18, the upper chamber 14 can easily be inspected, cleaned and repaired. An opening 21' is provided in the bottom 21 of the furnace 13, said opening being in alinement with the opening 16' in the horizontal wall 16, and its lower part preferably flaring outwardly so as to afford easy access to the chamber 15 for cleaning or repairing purposes.

Through the side wall of the furnace 13 extend two superposed oblique channels or flues 23, 23', the upper of these flues, 23, communicating with the circular chamber 14 and the lower flue, 23', with the chamber 15. Oil burners 24, 24' or like heating devices are provided to heat the chambers 14, 15 through the flues 23, 23' respectively. The lower chamber 15 has an off-gas or outlet flue 25 leading to an upright flue or stack 26, and the upper chamber 14 also communicates with said stack by way of an outlet or off-gas flue 27 extending into the side wall from the upper portion of the glass inlet 12. Owing to the circular shape of the chambers 14, 15, and to the oblique arrangement or direction of the inlet flues 23, 23', the flame or heating gases emanating from the burners 24, 24' will travel in a circular path through the chambers 14, 15 and will leave these chambers through the off-gas flues 27, 25 and the stack 26.

My auxiliary furnace may be connected with the glass-melting furnace, and supported, in any appropriate manner. In Figs. 1 and 2 of the drawings, I have shown, as an example, the preferred way of doing this: Vertical I-irons 28, 29 suitably secured to the glass-melting furnace, carry horizontal angle irons 30, 30′, 31, 32. Two of these angle irons, 30 and 30′, support a bottom plate 33 on which the furnace 13 rests, one of them, 30′, by direct engagement, the other, 30, by means of brackets 34. A flange 33′ on the bottom plate 33 engages the lower portion of a sheet-metal plate or shell 35 surrounding the sides of the furnace 13, a flange 35′ on either end of said shell being secured to one of the vertical I-irons by suitable bolts. A layer of asbestos 36 or the like is preferably interposed between the walls of the furnace 13 and the shell 35. Additional means of support are provided through metal straps 37 secured to the shell 35 on either side of the furnace, these straps having holes 37′ at their upper portions, into which the hook-shaped ends of rods 38 are inserted. The upper ends of the rods extend through holes in the angle iron 32, and are screw-threaded to receive nuts 39, suitable washers 40 being provided to engage the nuts and the angle iron 32. Preferably, the rods 38 consist of two separate pieces connected with each other by a turn buckle 41 so that the length of the rods may be adjusted for the purpose of properly leveling the apparatus.

The mechanism for operating the plunger 18 which controls the outlet 17″, 17′ from the chamber 14 is shown in Figs. 1 to 4 and is constructed as follows: The upper portion of the plunger, which latter is made of fire clay or other suitable refractory material, is connected rigidly, by means of a clamping ring 42 to a sleeve 43 through which it extends. For this purpose the upper portion of the sleeve is formed with a slot as shown at 43′. A bracket 44 through which the sleeve 43 extends loosely, is adapted to hold the sleeve against lateral movement, and a screw 44′ extending through the bracket 44 and into the slot 43″ prevents the sleeve 43 from turning around its own axis, so that the sleeve will be able to perform only an up-and-down movement. The other end of the bracket 44 is secured to the angle iron 32, as is also another supporting bracket 45, the purpose of which will be described presently. At its central portion, the sleeve 43 has a lateral flange 43″, the lower surface of which is a cam surface adapted to be engaged by a cam collar 46 which is supported by the bracket 45 and adapted to turn around a sleeve 45′ formed on the bracket 45. This sleeve portion 45′ also surrounds the lower end of the sleeve 43 and forms a guide therefor. In the normal position, the lower surface of the flange 43″ and the upper surface of the cam collar 46 fit one into the other, so that the outer surfaces of the flange 43″ and of the cam collar 46 form together a continuous cylindrical surface.

The cam collar 46 is provided with lugs 46′ located on opposite sides thereof and pivotally connected with rods 47, 48. At their other ends, these rods have pin-and-slot connections 47′, 48′ respectively, with levers 49, 50 fulcrumed at 49′, 50′ to brackets 51, 52 carried by the furnace 13 or rather by the shell 35 surrounding it. It will be seen that one of the rods, 47, is shorter than the other, so that the lower end of the corresponding lever 49 will be in advance of the lower end of the other lever. A push exerted on the projecting lever will rock the cam collar 46, and this in turn will lift the sleeve 43 with the plunger 18. A spring 53 is adapted to assist the sleeve 43 in returning to its lower position, after the cam collar 46 has resumed its original position. Additional supports for the brackets 44 and 45 are provided in the shape of brackets 54, 55 secured to the auxiliary furnace by means of straps 56 mounted on the shell 35. The chambers 14, 15 may be provided with peep holes 57, 58 extending through the side wall of the furnace 13.

The operation of my apparatus is, briefly described, as follows: With the gate 11′ in the raised position, the glass melted in the furnace 10 flows through 11 and 12 into the circular chamber 14, the normal glass level being indicated at G. The flames or heating gases emanating from the burners 24, 24′ will travel through the inlet flues 23, 23′ into the chambers 14, 15, passing out through the outlet flues 27, 25 to the stack 26. On their way, the gases do not only heat the glass surface, but will also give off heat to the walls of the circular chambers, so that the glass contained in the chamber 14 is being heated from below as well as from above. As mentioned above, I may regulate the heating action so that the glass either is kept at the temperature which it has when it leaves the melting furnace, or is heated to a higher degree.

When it is desired to withdraw some glass from the auxiliary furnace 13, the lower end of the lever 49, which is in advance of the lower end of the lever 50, is pushed inward, in the direction toward the furnace. This will cause the rod 47 to rock the cam collar 46, and the cam surface of the latter will slide on the cam surface of the flange 43″, the sleeve 43 being held against following the rotation of the cam collar 46 by the screw 44′. It will be clear that the sleeve 43 will thus be shifted upward, taking the plunger 18 with it and letting some liquid glass drop out through the outlets 17″, 17′ and 21′ into the mold M, which at that time will be in proper position under the opening 21′. A portion of the heating gases in the chamber 15 will pass out through 21' and escape between the mold M and the bottom wall 21 so that no cold air can come into contact with the glass dropping out through 21'.

In order to shut off the supply of gas, the lower end of the lever 50, which through the rocking movement of the cam collar has been brought forward, in advance of the lower end of the other lever, will be pushed inward, in the direction of the furnace, thus causing the cam collar to return to its original position, allowing the sleeve 43 with the plunger 18 to drop down, partly by gravity and partly by the action of the spring 53, until the lower end of the plunger has become seated in the tapered outlet 17'' and this outlet closed.

The levers 49, 50 may be operated either by hand or by the machine carrying the mold or molds to which the glass is to be supplied. In the latter case, the operation will be entirely automatic, and the same measured quantity of glass will be supplied to each mold.

The heating of the two chambers 14 and 15 is of great advantage because not only is the glass kept at the desired temperature and not exposed to cold air during the time it is being transferred to the mold, but the glass also does not come into contact with any cold part of the apparatus from the time it leaves the melting furnace until it reaches the mold in which it is to be subjected to further treatment. The glass therefore will be of uniform consistency and plasticity throughout the operation of the transfer.

I claim as my invention:

1. In a glass-discharging device, a furnace having two superposed chambers having vertically-alined glass outlets, the upper chamber having a glass inlet, and independent means for heating said two chambers.

2. In a glass-discharge device, a furnace provided with two superposed chambers having registering glass outlets, the upper chamber having a glass inlet, separate inlets for admitting heating gases to said chambers, and a common outlet for the heating gases preceding from both chambers.

3. In combination with a glass-melting furnace, an auxiliary furnace having two superposed chambers of substantially equal cross-sectional area, the upper one of these chambers communicating with the glass-melting furnace and having a glass outlet to the lower chamber, said lower chamber having an outlet in alinement with the first-named outlet, means for controlling said first-named outlet and means for heating both chambers.

4. In a glass-discharging device, a furnace provided with superposed chambers having registering glass outlets, the upper chamber having a glass inlet, means for admitting and discharging heating gases to and from said chambers, the gas-outlet of the upper chamber being located adjacent to the glass inlet.

5. In combination with a glass-melting furnace, an auxiliary furnace having walls forming two superposed chambers, the upper one of these chambers communicating with the glass-melting furnace and having a glass outlet to the lower chamber, said lower chamber having an outlet in alinement with the first-named outlet, said walls having independent inlet flues for the admission of heating gases to the respective chambers and outlet flues for the escape of such gases, and means for controlling the glass outlet of the upper chamber.

6. In combination with a glass-melting furnace, an auxiliary furnace having walls forming two superposed chambers of circular shape, and substantially of equal diameters, the upper one of these chambers communicating with the glass-melting furnace and having a glass outlet to the lower chamber, said lower chamber having an outlet in alinement with the first-named outlet, said walls having inlet flues for the admission of heating gases to said chambers and outlet flues for the escape of such gases, the direction of said inlet flues being at an angle to the radius of said circular chambers, and means for controlling the glass outlet of the upper chamber.

7. In a glass-discharging device, a container provided with an outlet, a longitudinally movable plunger normally closing said outlet and provided with a cam surface, a cam collar of a shape corresponding to that of the cam surface, and mounted to turn relatively to the plunger about the longitudinal axis of said plunger, means for rocking said cam collar, and means for holding said cam collar against longitudinal movement.

8. In a glass-discharging device, a container provided with an outlet, a plunger movable lengthwise of said outlet and normally closing the same, a sleeve rigidly secured to said plunger and provided with a cam surface, a cam collar of a shape corresponding to that of the cam surface, and held against axial movement, means for rocking said cam collar, and means for holding said sleeve and plunger against rotation.

9. In a glass-discharging device, a furnace provided with an upper chamber having a glass inlet, a lower chamber having a glass outlet, a nozzle establishing communication between said chambers and located exteriorly of the lower chamber above said outlet, and means for passing heating gases through said chambers.

10. In a glass-discharging device, a furnace provided with superposed chambers and with a nozzle through which said chambers are adapted to communicate with each other, said nozzle being located exteriorly of the lower chamber, the upper chamber having a glass inlet, and the lower chamber having a glass outlet in registry with said nozzle, means for passing heating gases through said chambers, and a plunger adapted to become seated on said nozzle to close the same and extending upwardly from said nozzle through said upper chamber, the lower chamber thus being unobstructed.

11. In a glass-discharging device, a glass-container provided with an outlet, a plunger normally closing said outlet and provided with cam-engaging means, a cam collar mounted to turn relatively to said plunger but held against longitudinal movement, and means for rocking said cam collar.

12. In a glass-discharging device, a glass-container provided with an outlet, a plunger normally closing said outlet and provided with a cam-engaging sleeve rigid with the said plunger, a cam collar through which the plunger is adapted to move lengthwise, said collar being arranged to coöperate with said sleeve, and being held against longitudinal movement, but mounted to turn relatively to the plunger about the longitudinal axis of the plunger, and means for rocking said cam collar.

13. In a glass-discharging device, a glass-container provided with an outlet, a longitudinally-movable plunger normally closing said outlet and provided with cam-engaging means, a cam-collar mounted to turn relatively to said plunger but held against longitudinal movement, means for rocking said collar in one direction, and separate means for rocking the cam collar in the opposite direction.

In testimony whereof I have signed this specification in the presence of two subscribing witnesses.

SYDNEY L. SEARS.

Witnesses:
P. C. DOYLE,
GEO. ALEXAM.